United States Patent
Ito

(10) Patent No.: US 10,448,350 B2
(45) Date of Patent: Oct. 15, 2019

(54) COMMUNICATION APPARATUS, COMMUNICATION SYSTEM AND COMMUNICATION METHOD

(71) Applicant: Mitsubishi Electric Corporation, Tokyo (JP)

(72) Inventor: Junichiro Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/078,870

(22) PCT Filed: Mar. 31, 2016

(86) PCT No.: PCT/JP2016/060817
§ 371 (c)(1),
(2) Date: Aug. 22, 2018

(87) PCT Pub. No.: WO2017/168723
PCT Pub. Date: Oct. 5, 2017

(65) Prior Publication Data
US 2019/0059065 A1 Feb. 21, 2019

(51) Int. Cl.
*H04W 56/00* (2009.01)
*H04W 8/00* (2009.01)
(Continued)

(52) U.S. Cl.
CPC ....... *H04W 56/0015* (2013.01); *H04W 8/005* (2013.01); *H04W 72/0433* (2013.01);
(Continued)

(58) Field of Classification Search
CPC ..... H04W 84/20; H04W 84/22; H04W 84/18; H04W 72/0433; H04W 72/0406; H04W 8/005
See application file for complete search history.

(56) References Cited

U.S. PATENT DOCUMENTS 7,907,898 B2 * 3/2011 Krishnan ............... H04W 92/18
455/41.2
8,553,887 B2 * 10/2013 Hong .................... H04L 9/0833
380/278
(Continued)

FOREIGN PATENT DOCUMENTS

CN 103250353 A 8/2013
EP 2560348 A2 2/2013
(Continued)

OTHER PUBLICATIONS

International Search Report dated Jun. 21, 2016, in PCT/JP2016/060817, filed Mar. 31, 2016.
(Continued)

Primary Examiner — Robert M Morlan
(74) Attorney, Agent, or Firm — Oblon, McClelland, Maier & Neustadt, L.L.P.

(57) ABSTRACT

A master station capable of controlling a slave station, includes a transmission unit, a reception unit, and a device control unit. The transmission unit and the reception unit communicate via a network with another communication apparatus capable of controlling a slave station. The device control unit acquires slave station information indicating slave stations to be controlled by the other communication apparatus, obtains, as a controlled slave station of the master station, a slave station which does not overlap with a slave station indicated by the slave station information based on the acquired slave station information, and generates control information for controlling the controlled slave station of the master station. The transmission unit transmits the control information to the controlled slave station of the master station.

14 Claims, 15 Drawing Sheets

(51) Int. Cl.
*H04W 72/04* (2009.01)
*H04W 74/08* (2009.01)
*H04W 84/20* (2009.01)

(52) U.S. Cl.
CPC ... *H04W 74/0816* (2013.01); *H04W 74/0883* (2013.01); *H04W 84/20* (2013.01)

(56) References Cited

U.S. PATENT DOCUMENTS

| | | | |
|---|---|---|---|
| 9,450,831 B2* | 9/2016 | Soneda | H04W 40/32 |
| 2003/0036807 A1 | 2/2003 | Fosler | |
| 2008/0240116 A1* | 10/2008 | Niu | H04W 64/00 370/400 |
| 2012/0083902 A1 | 4/2012 | Daum et al. | |
| 2016/0380778 A1* | 12/2016 | Shen | H04W 40/00 709/209 |

FOREIGN PATENT DOCUMENTS

| | | |
|---|---|---|
| JP | 2003-318943 A | 11/2003 |
| JP | 2009-10610 A | 1/2009 |
| JP | 2011-81490 A | 4/2011 |
| JP | 2011-210025 A | 10/2011 |

OTHER PUBLICATIONS

Decision to Grant a Patent dated Jul. 7, 2017, in JP 2017-508591, with unedited computer generated English translation.
Notice of Reasons for Refusal, dated Jun. 8, 2018, in TW 106109164, with English translation.

* cited by examiner

FIG.6

[REQUEST]

| COMMAND | | SUB-COMMAND | |
|---|---|---|---|
| L | H | L | H |
| 01H | 01H | 00H | 00H |

[RESPONSE]

| MODEL NAME | MODEL NAME CODE |
|---|---|
| L - - - - - - - - - - - - - H | L H |

COMMUNICATION APPARATUS, COMMUNICATION SYSTEM AND COMMUNICATION METHOD

FIELD

The present invention relates to a communication apparatus, a communication system, and a communication method for acquiring control over a controlled device.

BACKGROUND

There is a system which includes a plurality of control devices capable of controlling controlled devices on the same network in preparation for malfunctions of the control devices or the like. In such a system, among the control devices, a control device having control operates a specific controlled device. For example, Patent Literature 1 discloses a technique in which control for operating a specific object to be controlled is transferred between programmable display devices which are control devices.

CITATION LIST

Patent Literature

Patent Literature 1: Japanese Patent Application Laid-open No. 2011-81490

SUMMARY

Technical Problem

However, according to the technique described in the above Patent Literature 1, each control device inquires of another control device whether the other control device has the control over a specific controlled device by an operation from a user. Then, the control device acquires the control when any other control device does not have the control over the specific controlled device. Therefore, according to the technique disclosed in Patent Literature 1, it is necessary for the user to register in advance, to each control device which is a communication apparatus functioning as a master station, information (master station information) on all other master stations existing on the network. Consequently, when there is registration omission or erroneous setting of the master station information, or when a master station is newly added on the network, there is a possibility that acquisition of the control is not performed correctly and a slave station is redundantly controlled by two or more master stations, which is problematic.

In the technique described in Patent Literature 1, an inquiry is made by an operation from the user as to whether a control device has control over a controlled device which is a slave station. Consequently, a complicated operation is required before the user can operate the slave station, which is problematic.

The present invention has been made in view of the above, and it is an object of the present invention to provide a communication apparatus capable of avoiding redundant control over a controlled device and determining whether it is possible to operate the controlled device without requiring an operation by a user.

Solution to Problem

In order to solve the above-described problems and achieve the object, the present invention includes, in a communication apparatus capable of controlling a slave station, a communication unit which communicates via a network with another communication apparatus capable of controlling a slave station. The communication apparatus includes a control unit which acquires slave station information indicating slave stations to be controlled by the other communication apparatus, obtains a slave station which does not overlap with a slave station indicated by the slave station information as a controlled slave station of the communication apparatus based on the acquired slave station information, and generates control information for controlling the controlled slave station of the communication apparatus, and a transmission unit which transmits the control information to the controlled slave station of the communication apparatus.

Advantageous Effects of Invention

The communication apparatus according to the present invention has an effect of avoiding redundant control over a controlled device and determining whether it is possible to operate the controlled device without requiring an operation by a user.

BRIEF DESCRIPTION OF DRAWINGS

FIG. 6 is a diagram illustrating an example of request data and an example of response data corresponding thereto.

DESCRIPTION OF EMBODIMENTS

Hereinafter, a communication apparatus, a communication system, and a communication method according to each embodiment of the present invention will be described in detail with reference to the drawings. The invention is not limited to the embodiments.

First Embodiment

Figure 1:
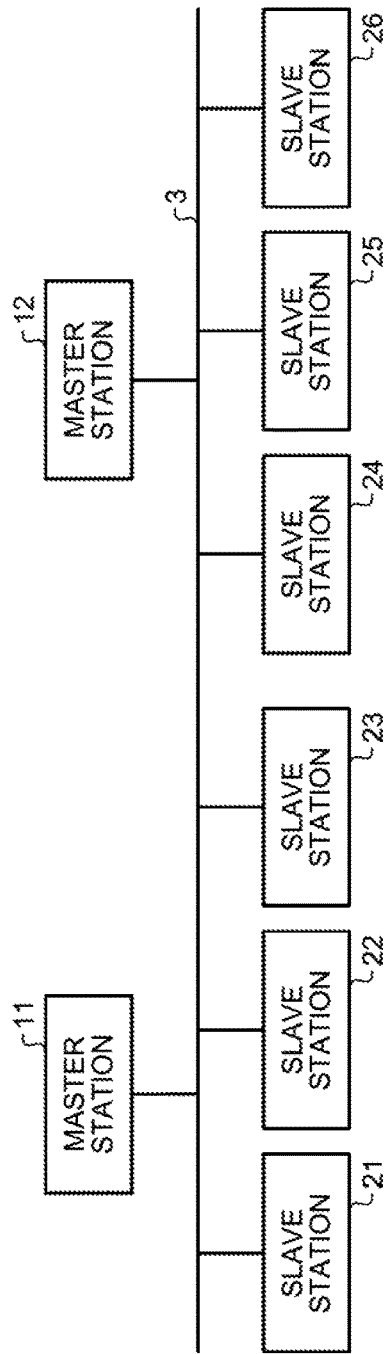
FIG. 1 is a diagram illustrating a configuration example of a communication system according to a first embodiment.

FIG. 1 is a diagram illustrating a configuration example of a communication system according to a first embodiment of the present invention. As illustrated in FIG. 1, the communication system of the first embodiment includes master stations 11 and 12, which are communication apparatuses, and slave stations 21 to 26, which are communication apparatuses controlled by the master stations 11 and 12. The master stations 11 and 12 perform a control acquisition process according to the present invention, which will be described later, and in a case where the master stations 11 and 12 have control over the slave stations 21 to 26, the master stations 11 and 12 control the slave stations 21 to 26. The master stations 11 and 12 are multiple communication apparatuses capable of controlling at least one of the slave stations 21 to 26.

The master stations 11 and 12 are, for example, programmable logic controllers (PLCs) or personal computers. The slave stations 21 to 26 are, for example, vision sensors or driving devices. The master stations 11 and 12 and the slave stations 21 to 26 are connected to one another by a network line 3. Here, an example will be described in which the master stations 11 and 12 and the slave stations 21 to 26 are connected by the network line 3. In the first embodiment, however, the master stations 11 and 12 and the slave stations 21 to 26 may be wirelessly connected.

Figure 2:
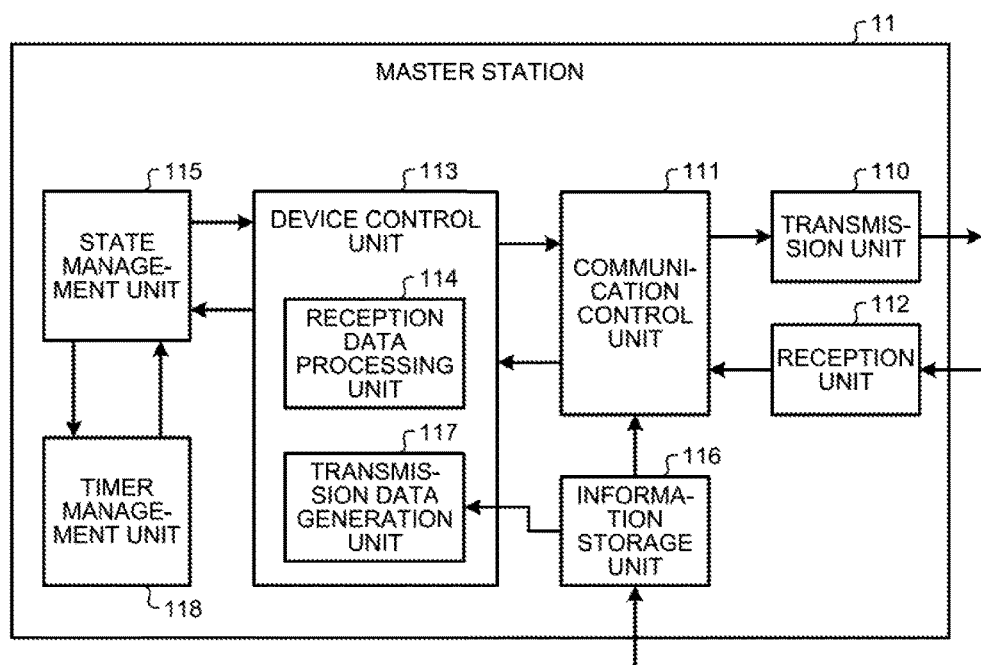
FIG. 2 is a diagram illustrating a configuration example of a master station of the first embodiment.

FIG. 2 is a diagram illustrating a configuration example of the master station 11 of the first embodiment. As illustrated in FIG. 2, the master station 11 of the first embodiment includes a transmission unit 110, a reception unit 112, a communication control unit 111, an information storage unit 116, a device control unit 113, a state management unit 115, and a timer management unit 118. The device control unit 113 as a control unit includes a reception data processing unit 114 and a transmission data generation unit 117.

In the information storage unit 116, information on slave stations to be controlled by the master station 11 is stored. The information on slave stations includes information indicating slave stations. Here, an example will be described in which Internet Protocol (IP) addresses are used as the information indicating slave stations, but the information indicating slave stations is not limited to the IP addresses. The information on slave stations is registered in advance by a user. The information on slave stations may be changeable by the user.

The reception unit 112 is a receiver which receives data from the outside of the master station 11 via the network line 3. The communication control unit 111 performs, for example, a framing process of converting transmission data output from the device control unit 113 into a communication frame, and outputs the framed transmission data to the transmission unit 110. The communication control unit 111 performs deframing or the like with respect to the reception data received by the reception unit 112, and outputs the resultant to the device control unit 113. The transmission unit 110 and the reception unit 112 also function as a communication unit which communicates with another communication apparatus via a network.

The reception data processing unit 114 of the device control unit 113 analyzes the reception data output from the communication control unit 111. At that time, the reception data processing unit 114 acquires a state of the master station 11 from the state management unit 115, determines whether the reception data is correct data depending on the acquired state, and when determines that the reception data is correct data, the reception data is used for an arithmetic process for updating the state management unit 115 or for controlling devices. When the reception data processing unit 114 determines that the reception data is not correct data, the reception data processing unit 114 discards the reception data.

The transmission data generation unit 117 of the device control unit 113 generates transmission data and outputs the generated transmission data to the communication control unit 111 for the transmission data. The communication control unit 111 determines a destination of the transmission data, that is, an addressee based on the information stored in the information storage unit 116. The transmission data generation unit 117 generates transmission data based on the information stored in the information storage unit 116 as necessary. The transmission unit 110 is a transmitter which transmits the framed transmission data output from the communication control unit 111 via the network line 3.

The state management unit 115 acquires the reception data output from the device control unit 113 and values of various timers measured by the timer management unit 118, and updates the state of the master station 11 based on the reception data and the values. The master station 12 has a configuration similar to the configuration of the master station 11.

Figure 3:
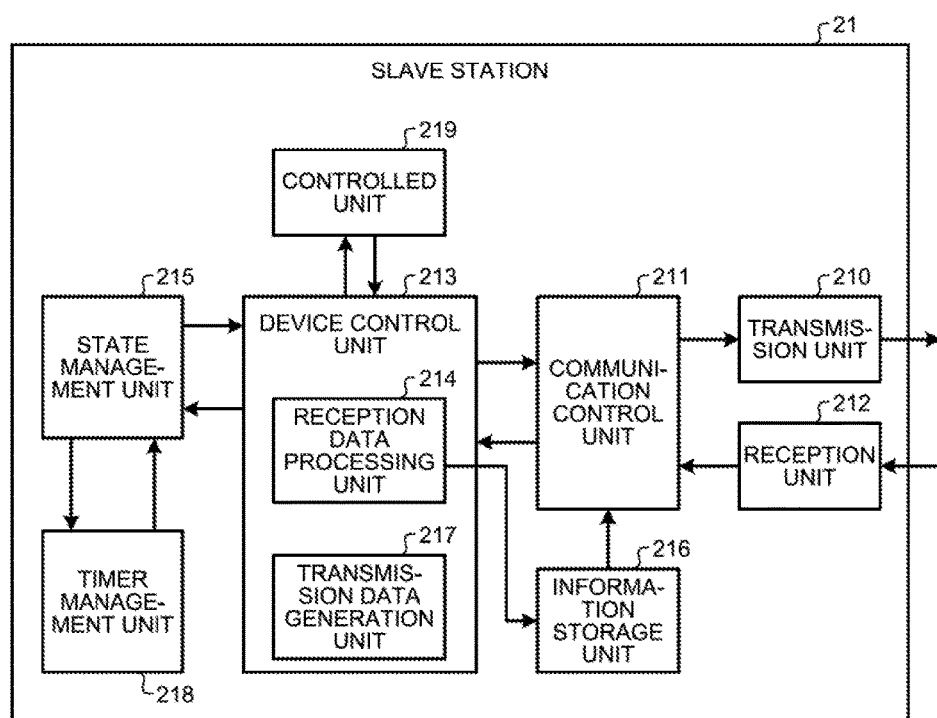
FIG. 3 is a diagram illustrating a configuration example of a slave station of the first embodiment.

FIG. 3 is a diagram illustrating a configuration example of the slave station 21 of the first embodiment. The slave station 21 includes a transmission unit 210, a reception unit 212, a communication control unit 211, a device control unit 213, a state management unit 215, an information storage unit 216, a timer management unit 218, and a controlled unit 219. The device control unit 213 includes a reception data processing unit 214 and a transmission data generation unit 217.

The reception unit 212 is a receiver which receives data from the outside of the slave station 21 via the network line 3. The communication control unit 211 performs a framing process or the like with respect to transmission data output from the device control unit 213, and outputs the framed transmission data to the transmission unit 210. The communication control unit 211 performs deframing or the like with respect to the reception data received by the reception unit 212, and outputs the resultant to the device control unit 213.

The reception data processing unit 214 of the device control unit 213 analyzes the reception data output from the communication control unit 211. When the reception data is data instructing an operation to the controlled unit 219, the reception data processing unit 214 outputs the data to the controlled unit 219. The controlled unit 219 is a device to be controlled by the master stations 11 and 12, and operates depending on data output from the reception data processing unit 214, that is, instructions. For example, when the slave station is a vision sensor, the controlled unit 219 is a sensor unit which images an object to be imaged and acquires an image.

The state management unit 215 manages the state of the slave station 21. The timer management unit 218 manages various timers.

The transmission data generation unit 217 of the device control unit 213 generates transmission data and outputs the generated transmission data to the communication control unit 211 for the transmission data. The transmission data generation unit 217 generates transmission data addressed to the master stations 11 and 12 depending on instructions from the master stations 11 and 12. The transmission unit 210 is a transmitter which transmits the framed transmission data output from the communication control unit 211 via the network line 3. The configuration of each of the slave stations 22 to 26 is similar to the configuration of the slave station 21.

Figure 4:
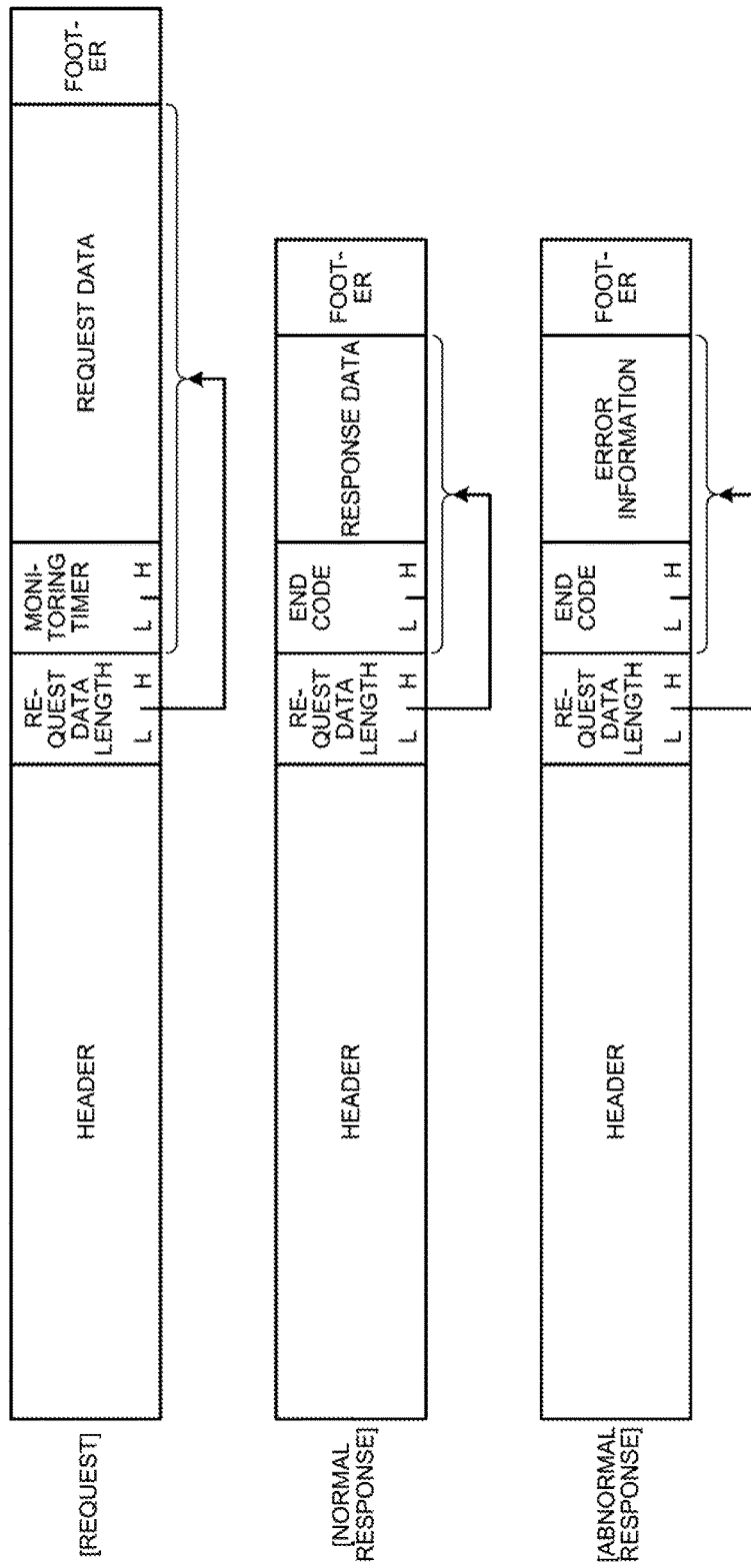
FIG. 4 is a diagram illustrating an example of a communication frame used in communication between master stations and slave stations of the first embodiment.

FIG. 4 is a diagram illustrating an example of a communication frame used in communication between the master stations and the slave stations of the first embodiment. As illustrated in FIG. 4, the communication frame used in the communication between the master stations and the slave stations in the present embodiment includes a request frame, a normal response frame, and an abnormal response frame. The normal response frame and the abnormal response frame are each a type of response frame. The request frame is a communication frame transmitted from the master stations to the slave stations and the response frame is a communication frame transmitted as a response from the slave stations or the master stations which have received the request frame.

For the purpose of describing operations of the present embodiment, the above three frames used will be described below, but communication frames other than the communication frames illustrated in FIG. 4 may be further used in communication between the master stations and the slave stations. In the following, an example will be described in which Ethernet (registered trademark), an Internet Protocol (IP), and a User Datagram Protocol (UDP) are used for communication between the master stations and the slave stations, but transmission formats and communication protocols in communication between the master stations and the slave stations are not limited thereto.

As illustrated in FIG. 4, each communication frame includes a header. The header includes an Ethernet/IP/UDP header and a subheader which is information indicating the type of communication frame such as a request frame and a response frame. In a case of the request frame, as illustrated in FIG. 4, a request data length indicating the length of the request data, a monitoring timer indicating a timer value in a monitoring timer described later, and request data are stored after the header. In the normal response frame, a response data length indicating the length of the response data, an end code indicating whether this is an abnormal response or a normal response, and response data are stored after the header. In the abnormal response frame, a response data length indicating the length of the response data, an end code indicating whether this is an abnormal response or a normal response, and error information indicating details of the content of abnormality are stored after the header. In the normal response frame, a value indicating normal response is stored in the end code, and in the abnormal response frame, a value indicating abnormal response is stored in the end code.

Figure 5:
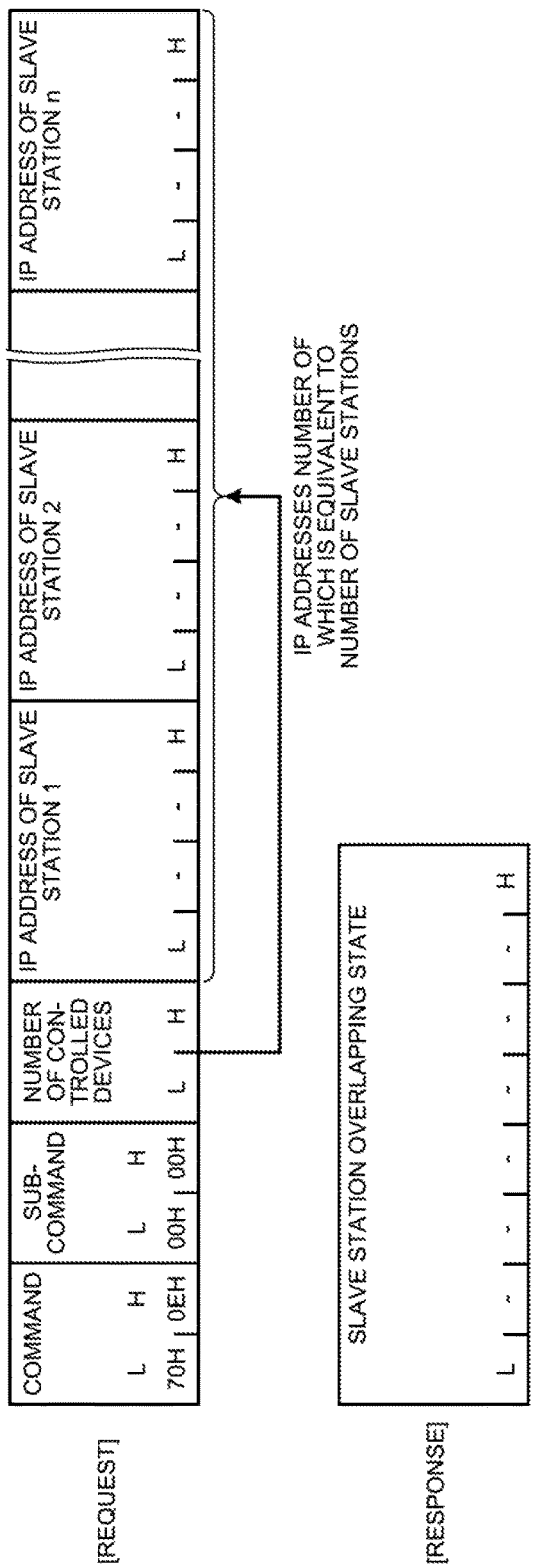
FIG. 5 is a diagram illustrating an example of request data and an example of response data corresponding thereto.
Figure 7:
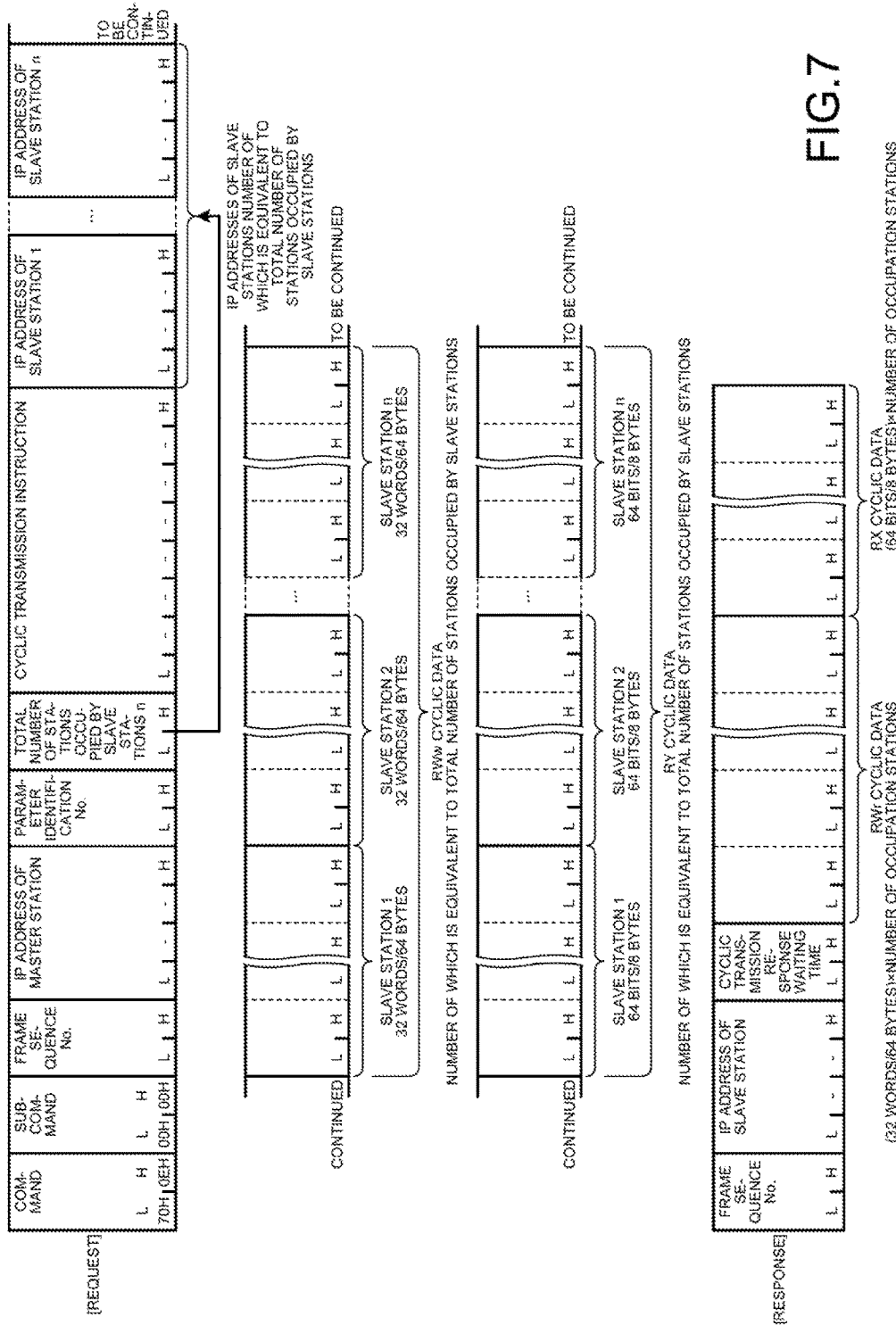
FIG. 7 is a diagram illustrating an example of request data and an example of response data corresponding thereto.

FIGS. 5 to 7 are diagrams illustrating examples of request data and examples of response data corresponding thereto. FIG. 5 illustrates the example of request data when confirming whether there is any overlap of slave stations between slave stations to be controlled by the master station as a source of the request frame and slave stations to be controlled by another master station. The request frame including the request data illustrated in FIG. 5 stored therein is transmitted from the master station at the start of an arbitration process for acquiring control over the slave station. The request data illustrated in FIG. 5 includes a command, a subcommand, the number of controlled devices, and IP addresses the number of which is equivalent to the number of controlled devices. Information is stored in the command and the subcommand, the information indicating that this is a request for confirming whether there is any overlap of slave stations between slave stations to be controlled by the master station as a source of the request frame and slave stations to be controlled by another master station. The controlled device represents a slave station.

The response data illustrated in FIG. 5 illustrates an example of response data stored in a response frame when the response frame is transmitted by the master station which has received the request frame including the request data illustrated in FIG. 5 stored therein. In the example illustrated in FIG. 5, an IP address of a slave station is stored in the response data, the slave station being in a slave station overlapping state, that is, being overlappingly set as an object to be controlled by a plurality of master stations. As will be described later, regarding the master station which has received a request frame including the request data illustrated in FIG. 5 stored therein, when there is coincidence between slave stations to be controlled by the master station and the IP addresses in the request data, the master station transmits a response frame in which the coincident IP address is stored in the response data illustrated in FIG. 5. The master station which has received the request frame including the request data illustrated in FIG. 5 stored therein does not transmit a response frame when there is no coincidence between the slave stations to be controlled by the master station and the IP addresses in the request data. The request frame in which the request data illustrated in FIG. 5 is stored is hereinafter referred to as a Persuasion request frame.

FIG. 6 illustrates an example of request data when acquisition of a model name of a slave station is requested. The request data illustrated in FIG. 6 includes a command and a subcommand. In the command and the subcommand, information indicating that this is a request for acquiring the model name of the slave station is stored. The response data illustrated in FIG. 6 illustrates an example of response data stored in a response frame when the response frame is transmitted by the slave station which has received the request frame including the request data illustrated in FIG. 6 stored therein. In the example illustrated in FIG. 6, the model name and a model name code of the slave station are stored in the response data. The model name code is a code indicating the model name. The request frame in which the request data illustrated in FIG. 6 is stored is hereinafter referred to as a Read Type Name request frame.

FIG. 7 illustrates an example of request data when cyclic transmission is requested to a slave station. In the cyclic transmission, stations periodically transmit data in turns. The request data illustrated in FIG. 7 includes a command, a subcommand, a frame sequence Number (No.), an IP address of a master station, a parameter identification No., the total number of stations occupied by slave stations, a cyclic transmission instruction, IP addresses of slave stations the number of which is equivalent to the total number of stations occupied by slave stations, $RW_w$ cyclic data the number of which is equivalent to the total number of stations occupied by slave stations, and the RY cyclic data the number of which is equivalent to the total number of stations occupied by slave stations. The cyclic transmission instruction has an area of 64 bits, and each slave station is allocated for each bit. A value of the bit indicates ON or OFF of the cyclic transmission of each slave station. Information indicating that this is a request for cyclic transmission is stored in the command and the subcommand. The $RW_w$ cyclic data and RY cyclic data are cyclic data transmitted from the master station to the slave station.

The response data illustrated in FIG. 7 illustrates an example of response data stored in a response frame when the response frame is transmitted by the slave station which has received the request frame including the request data illustrated in FIG. 7 stored therein. In the example illustrated in FIG. 7, a frame sequence No., the IP address of the slave station, cyclic transmission response waiting time, $RW_r$, cyclic data the number of which is equivalent to the number of occupation stations, and RX cyclic data the number of which is equivalent to the number of occupation stations are stored in the response data. The request frame in which the request data illustrated in FIG. 7 is stored is hereinafter referred to as a Cyclic Data request frame. The $RW_r$ cyclic data and the RX cyclic data are cyclic data transmitted from the slave station to the master station.

Figure 8:
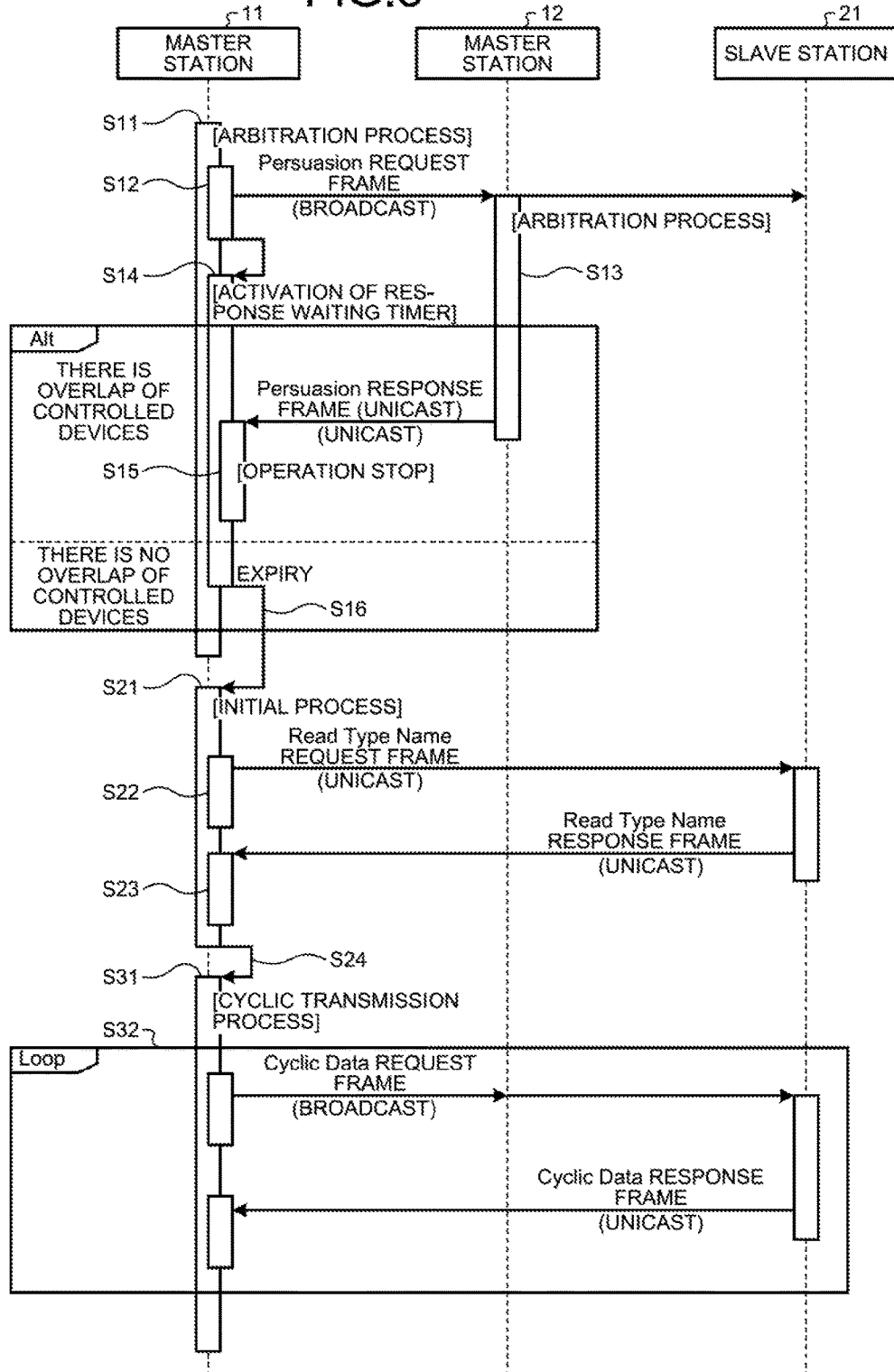
FIG. 8 is a sequence diagram illustrating operations in the first embodiment, from acquisition of control over the slave station after activation of the master station to start of communication with the slave station.

Next, the operations of the present embodiment will be described. FIG. 8 is a sequence diagram illustrating operations in the first embodiment, from acquisition of control over a slave station after activation of a master station to start of communication with the slave station. In the following description, it is assumed that the master station 11 is added to an existing system including the master station 12 and the slave station 21. The operations from the activation of the master station 11 to the start of communication with the slave station 21 will be described with reference to FIG. 8. That is, in the following, an example will be described in which the master station 11 operates as a first communication apparatus which performs the control acquisition process and the master station 12 operates as a second communication apparatus which is a communication apparatus other than the first communication apparatus. When the master station 12 performs the control acquisition process, the master station 11 and the master station 12 are interchanged in the following operations.

First, when the master station 11 is activated, an arbitration process for acquiring control over the slave station is performed (Step S11). Specifically, in order to start the arbitration process, the transmission data generation unit 117 reads IP addresses of slave stations to be controlled by the master station 11, the IP addresses being stored in the information storage unit 116, and outputs the number of slave stations to be controlled by the master station 11 and the read IP addresses to the communication control unit 111.

The master station 11 transmits a Persuasion request frame in broadcast (Step S12). Specifically, the communication control unit 111 generates request data based on information output from the transmission data generation unit 117, and sends the Persuasion request frame in which a broadcast address is stored as an addressee in the header to the network line 3 via the transmission unit 110.

The master station 11 activates a response waiting timer (Step S14). As a result, the master station 11 enters a response waiting state. Specifically, the timer management unit 118 activates the response waiting timer.

As illustrated in FIG. 5, the IP addresses of the slave stations to be controlled by the master station 11 are stored in the Persuasion request frame. The master station 12 on the same network which has received the Persuasion request frame compares IP addresses of slave stations stored as devices to be controlled by the master station 12 with the IP addresses in the Persuasion request frame as an arbitration process (Step S13). Then, when there are IP addresses coincident with each other, that is, duplicate addresses, the master station 12 transmits a Persuasion response frame to the master station 11 in unicast. When there is no coincident IP addresses, no response frame is transmitted.

As described above, the IP addresses of the slave stations stored in the Persuasion request frame are stored in the master stations 11 and 12 by the user in advance. The duplicate IP address is stored in the Persuasion response frame. Therefore, the master station 11, which has transmitted the Persuasion request frame, can identify the slave station overlappingly set as an object to be controlled by the master station 11 and the master station 12 by referring to the response data stored in the response frame.

That is, the device control unit 113 of the master station 11 generates acquisition request information indicating that acquisition of slave station information indicating a slave station controlled by the master station 12 is requested, and the transmission unit 110 transmits the Persuasion request frame which is a frame including the acquisition request information stored therein to the master station 12. The acquisition request information includes first information which is information indicating slave stations to be controlled by the master station 11 stored in the information storage unit 116. The Persuasion request frame is transmitted in broadcast, and is also transmitted to the master station 12. Then, the master station 11 acquires the IP address stored in the Persuasion response frame as the slave station information indicating the slave station controlled by the master station 12. The IP address stored in the Persuasion response frame is information indicating a slave station overlapping between slave stations controlled by the master station 12 and slave stations set as an object to be controlled by the master station 11, that is, information overlapping between the first information and second information which indicates slave stations to be controlled by the master station 12. When the slave stations to be controlled by the master station 11 are expressed as first slave stations and the slave stations to be controlled by the master station 12 are expressed as second slave stations, it can be said that the IP address stored in the Persuasion response frame is information indicating a slave station overlapping between the first slave stations and the second slave stations. The IP address stored in the Persuasion response frame is also information indicating the slave station controlled by the master station 12, that is, slave station information.

When the master station 11 receives the Persuasion response frame from the master station 12 while waiting for a response, the master station 11 determines that there is an overlap of slave stations which are controlled devices, and the operation is stopped (Step S15). Specifically, when the reception data processing unit 114 receives the response data stored in the Persuasion response frame via the reception unit 112 and the communication control unit 111, it is determined that there is an overlap of slave stations between the slave stations to be controlled by the master station 11 and the slave stations to be controlled by another master station, and a process for controlling the slave station is not performed.

On the other hand, when the response waiting timer expires without receiving the Persuasion response frame from the master station 12, the master station 11 determines that the master station 11 has the control over the slave station and proceeds to an initial process (Step S16). That is, the device control unit 113 of the master station 11 does not receive the Persuasion response frame, thereby acquiring the slave station information that there is no overlap between the slave stations to be controlled by the master station 11 and the slave stations to be controlled by the master station 12. Thus, the master station 11 can obtain a slave station of which the IP address is stored in the Persuasion request frame, as the controlled slave station over which the master station 11 has the control.

When the master station 11 determines that the master station 11 has the control over the slave station by the arbitration process, the master station 11 starts an initial process in order to confirm whether the slave station controlled by the master station 11 exists on the network (Step S21). In the initial process, first, the master station 11 transmits a Read Type Name request frame in unicast to the slave stations stored as an object to be controlled by the master station 11 (Step S22). Specifically, the transmission data generation unit 117 reads IP addresses of the slave stations to be controlled which are stored in the information storage unit 116, and instructs the communication control unit 111 to transmit the Read Type Name request frame to the IP addresses. The communication control unit 111 generates a Read Type Name request frame based on the instruction and sends the generated Read Type Name request frame to the network line 3 via the transmission unit 110. FIG. 8 illustrates an example in which the master station 11 transmits the Read Type Name request frame to the slave station 21.

The slave station 21, which has received the Read Type Name request frame, transmits a Read Type Name response frame to the master station 11, and the master station 11 receives the Read Type Name response frame (Step S23). Specifically, the communication control unit 211 of the slave station 21, which has received the Read Type Name request frame via the reception unit 212, notifies the reception data processing unit 214 that the Read Type Name request frame has been received. The reception data processing unit 214 notifies the communication control unit 211 of a model name and model name code of the slave station 21, and the communication control unit 211 transmits a response frame in which the model name and the model name code are stored as response data to the master station 11 via the transmission unit 210.

After the elapse of a predetermined period of time from the transmission of the Read Type Name request frame, in a case where the master station 11 has received at least one Read Type Name response frame as a response frame to the Read Type Name request frame during the predetermined period of time, the master station 11 proceeds to a "cyclic transmission process" (Step S24).

In the "cyclic transmission process", the master station 11 starts control in the "cyclic transmission process" described later with respect to a slave station which has transmitted the Read Type Name response frame in the "initial process". On the other hand, with respect to a slave station which has not responded in the "initial process", the "arbitration process" (Step S11) and the "initial process" (Step S21) described above are performed again in parallel with the "cyclic transmission process".

In the "cyclic transmission process" (Step S31), the master station 11 transmits the Cyclic Data request frame illustrated in FIG. 7 in broadcast, and the slave station 21, which has received the Cyclic Data request frame, transmits a Cyclic Data response frame which is a response frame to the Cyclic Data request frame to the master station 11 in unicast. In the "cyclic transmission process" (Step S31), transmission of the Cyclic Data request frame from the master station 11 and transmission of the Cyclic Data response frame from the slave station are repeatedly performed (Step S32).

That is, in the "cyclic transmission process", the device control unit 113 of the master station 11 generates control information for controlling the controlled slave station which is a slave station over which the master station 11 has the control, and the transmission unit 110 transmits the control information as a Cyclic Data request frame to the controlled slave station. The Cyclic Data request frame is transmitted in broadcast, but as described with reference to the figure, in the cyclic transmission instruction, a slave station which turns ON cyclic transmission, that is, a slave station to be controlled is specified.

Although the slave station 21 is illustrated in FIG. 8, the master station 11 determines whether there is any overlap of slave stations, by the "arbitration process", with respect to each slave station to be controlled which is stored in the information storage unit 116 of the master station 11. When the response waiting timer expires without receiving the Persuasion response frame by the "arbitration process", the master station 11 determines that regarding all slave stations to be controlled, there is no overlap of slave stations between slave stations to be controlled by the master station 11 and the slave stations to be controlled by another master station, and performs the "initial process" to all slave stations to be controlled. Then, the master station 11 performs the "cyclic transmission process" to the slave station from which the Read Type Name response frame has been received in the "initial process", and performs the "arbitration process" and the "initial process" again to the slave station from which the Read Type Name response frame has not been received. On the other hand, when there are multiple slave stations to be controlled by the master station 11, the master station 11 has received the Persuasion response frame by the "arbitration process", and the IP address stored in the Persuasion response frame is an IP address of at least one of the slave stations to be controlled by the master station 11, the master station 11 stops the operation of the slave station with the duplicate IP address, that is, does not control the slave station. With respect to the slave stations with non-duplicate IP addresses, the master station 11 performs the above-described "initial process" and subsequent processes.

In the above description, the operations at the time of activation of the master station 11 are taken as an example. However, the "arbitration process", the "initial process" and the "cyclic transmission process" are performed at the time of activation of the master station 12, similarly to the master station 11.

Figure 9:
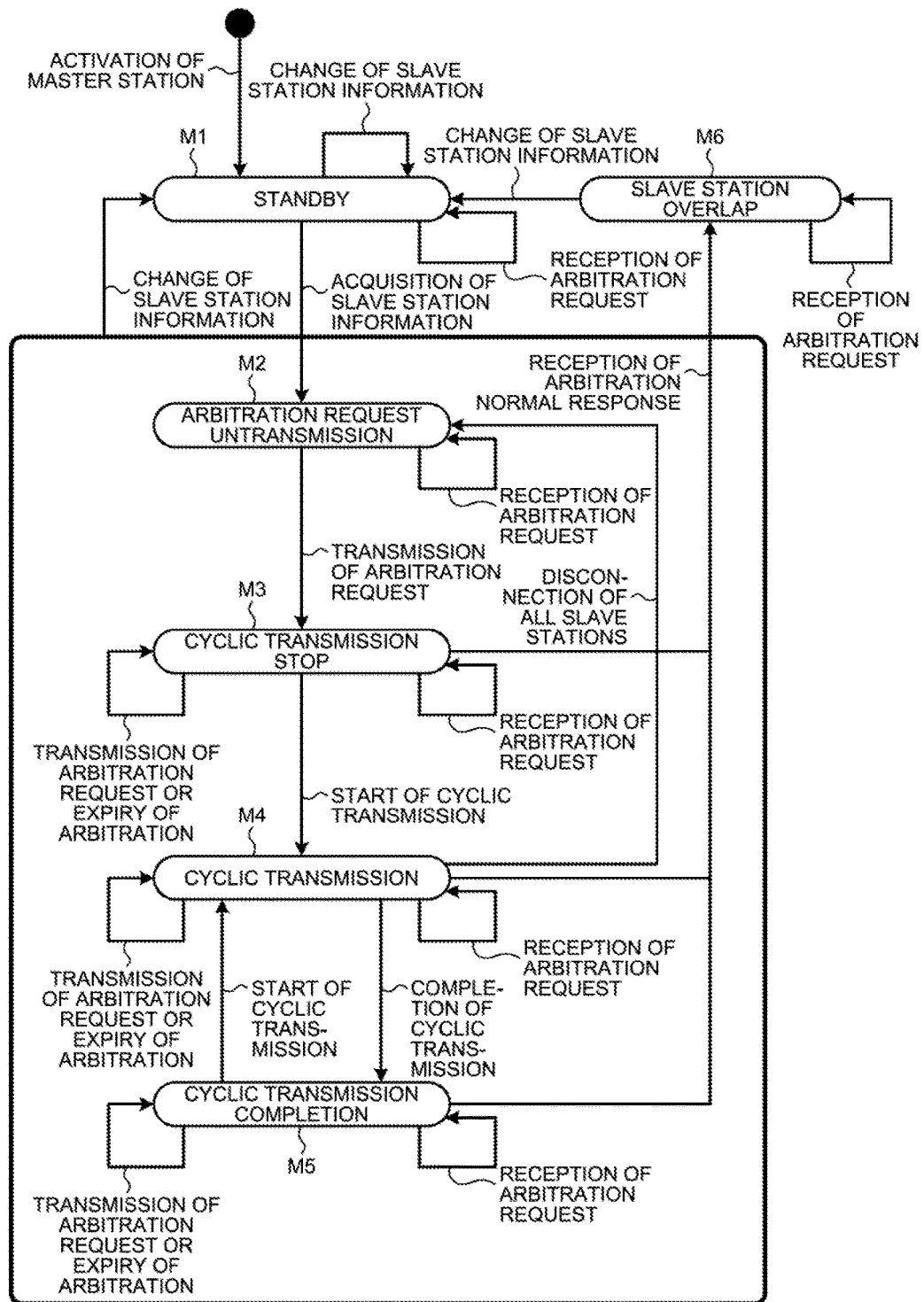
FIG. 9 is a state transition diagram of an overall state of the master station of the first embodiment.
Figure 10:
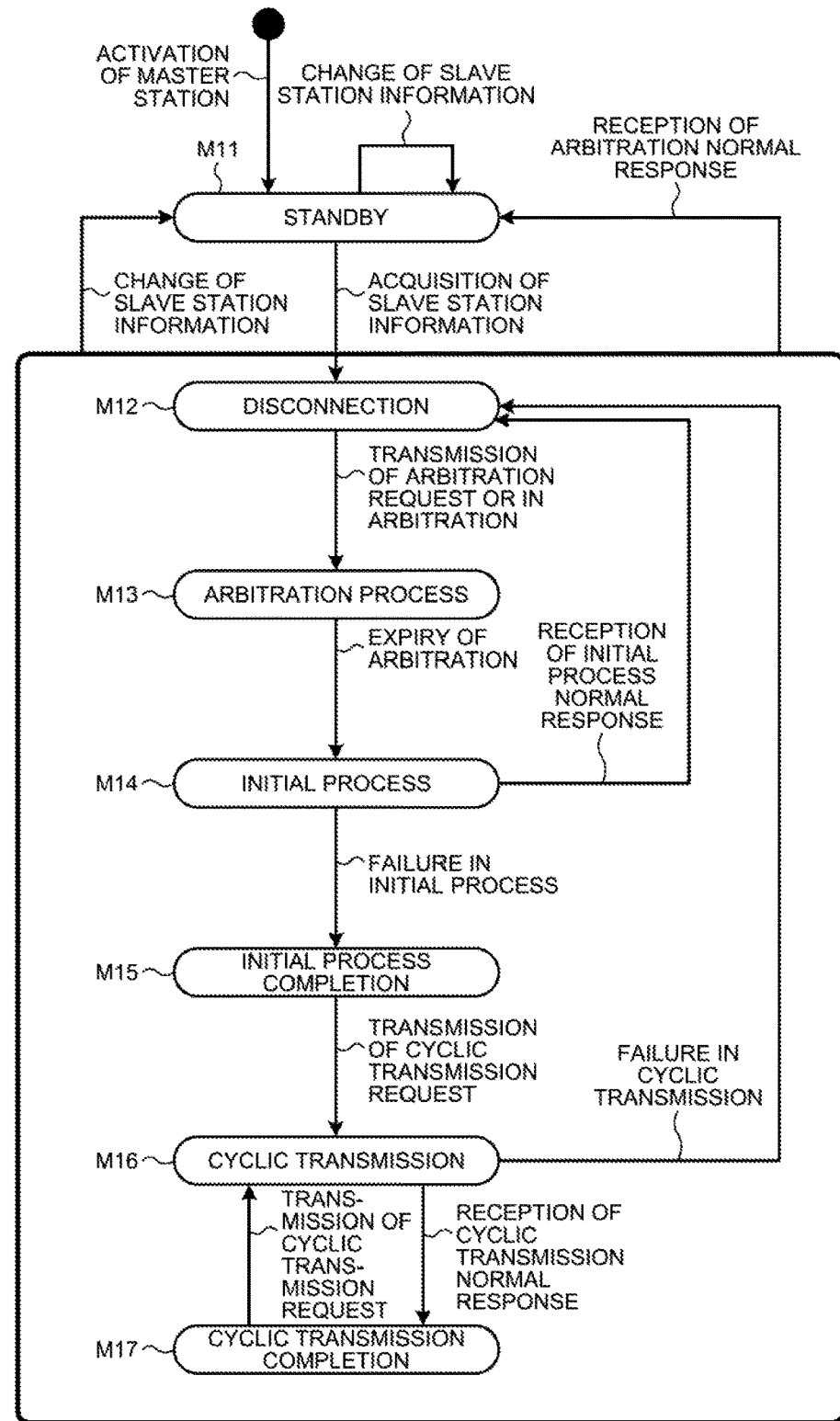
FIG. 10 is a state transition diagram of an individual state for each slave station of the master station of the first embodiment.

FIGS. 9 and 10 are state transition diagrams of the master stations 11 and 12 of the first embodiment. The states of the master stations 11 and 12 are managed in two states, an overall state indicating a state for all slave stations and an individual state indicating a state for each slave station. In the latter, the state is defined for each slave station. FIG. 9 illustrates the state transition of the overall state, and FIG. 10 illustrates the state transition of the individual state for each slave station. The state management units 115 of the master stations 11 and 12 each manage the overall state and the individual state for each slave station. In the following description of the state transition, the master station 11 will be taken as an example, but the same applies to the master station 12.

After activation of the master station 11, the state management unit 115 of the master station 11 sets the overall state to a state of standby M1 and the individual state to a state of standby M11. The transmission data generation unit 117, which has acquired the information on the slave stations to be controlled, that is, the IP addresses from the information storage unit 116, notifies the state management unit 115 of the acquisition, and the state management unit 115 sets the overall state to arbitration request untransmission M2, which is a state where an arbitration request is untransmitted, and sets the individual states for all slave stations to disconnection M12. In this state, the master station 11 transmits a Persuasion request frame to the network. The transmission data generation unit 117 notifies the state management unit 115 that the Persuasion request frame has been transmitted, and the state management unit 115 sets the overall state to cyclic transmission stop M3, which is a state where cyclic transmission is stopped, and the individual state to arbitration process M13, which is a state where the arbitration process is performed. At that time, the master station 11 activates an arbitration response waiting timer simultaneously with the transmission of the Persuasion request frame.

The state management unit 115 is notified of the transmission of each frame by the transmission data generation unit 117, the reception of each frame by the reception data processing unit 114, the expiry of each timer, and the like from the device control unit 113. However, in the following, descriptions of the operations of these notifications will be omitted. When the master station 11, which has transmitted the Persuasion request frame, receives a Persuasion response frame transmitted by the master station 12, which is another master station, the state management unit 115 transitions the overall state to slave station overlap M6. The state management unit 115 transitions an individual state corresponding to a slave station with a duplicate IP address notified by the Persuasion response frame to the standby M11. As a result, the operation for controlling the slave station is stopped. After transitioning the overall state to the slave station overlap M6, the state management unit 115 changes the information on the slave stations to be controlled in the information storage unit 116, specifically, the state management unit 115 deletes information corresponding to the slave station of which overlap is notified by the Persuasion response frame from the information on the slave stations to be controlled in the information storage unit 116, and transitions the overall state to the standby M1. When receiving the Persuasion response frame, the state management unit 115 transitions an individual state corresponding to a slave station with non-duplicate IP address to initial process M14, which is a state where the initial process is performed. On the other hand, when arbitration response waiting timeout occurs without receiving the Persuasion response frame, the state management unit 115 transitions the individual states for all slave stations to be controlled to the initial process M14.

In the initial process, the master station 11 transmits a Read Type Name request frame to the slave stations and activates an initial response waiting timer. The state management unit 115 of the master station 11 sets an individual state for the slave station from which the Read Type Name response frame has been received to initial process completion M15, which is a state where the initial process has been completed, and transitions an individual state for the slave station for which initial response waiting timeout has occurred without receiving the Read Type Name response frame to the arbitration process M13. The slave station from which the Read Type Name response frame has been received refers to the slave station which has transmitted the Read Type Name response frame when the master station 11 received the Read Type Name response frame. Hereinafter, similarly, the slave station from which the master station 11 has received the frame refers to the slave station which has transmitted the frame when the master station 11 received the frame.

With respect to the slave stations which have transitioned to the arbitration process M13, the master station 11 performs the arbitration process and the initial process again. When receiving the Read Type Name response frame from at least one slave station, the state management unit 115 determines that cyclic transmission is possible and transitions the overall state to cyclic transmission M4, which is a state where cyclic transmission is performed. At that time, the state management unit 115 transitions the individual state for the slave station from which the Read Type Name response frame has been received to cyclic transmission M16. In the cyclic transmission process, the master station 11 transmits a cyclic transmission request, that is, a Cyclic Data request frame, and receives a cyclic transmission normal response, that is, a Cyclic Data response frame from the slave station. When receiving the cyclic transmission normal response from the slave station, the state management unit 115 transitions the overall state to cyclic transmission completion M5, which is a state where the cyclic transmission has been completed, and transitions the individual state for the slave station from which the cyclic transmission normal response has been received to cyclic transmission completion M17.

In the cyclic transmission process, while receiving the cyclic transmission normal response from all of the slave stations from which the Read Type Name response frame has been received, the master station 11 repeatedly transitions the overall state between the cyclic transmission M4 and the cyclic transmission completion M5, and the individual states for the slave stations from each of which the Read Type Name response frame has been received between the cyclic transmission M16 and the cyclic transmission completion M17.

In the cyclic transmission M4 and M16, when there is a slave station which has failed in cyclic transmission, that is, when there is a slave station from which the master station 11 has received the abnormal response frame, the state management unit 115 transitions the individual state for the slave station to the disconnection M12. On the other hand, when there is a slave station which has failed in cyclic transmission and there is a slave station from which the cyclic transmission normal response has been received, the overall state is not changed. When all slave stations fail in the cyclic transmission, the state management unit 115 transitions the overall state to the arbitration request untransmission M2.

As described above, when the overall state is repeatedly transitioned between the cyclic transmission M4 and the cyclic transmission completion M5, there may be a case where the individual states which are repeatedly transitioned between the cyclic transmission M16 and the cyclic transmission completion M17, and which are transitioned to the disconnection M12 are mixed. In that case, regarding the overall state, the cyclic transmission M4 and the cyclic transmission completion M5 are repeated, whereas the individual state for the slave station which has transitioned to the disconnection M12 is any one of the disconnection M12, the arbitration process M13, the initial process M14, and the initial process completion M15. Accordingly, even when the overall state is the cyclic transmission M4 and the cyclic transmission completion M5, the master station 11 may perform the arbitration process. When an arbitration normal response, that is, a Persuasion response frame indicating that there is an overlap of slave stations is received through the arbitration process, transition to the slave station overlap M6 is performed, and when the Persuasion response frame is not received, that is, the timeout occurs, the overall state is not changed.

In a case where the master station 11 receives an arbitration request from the master station 12, which is another master station, the master station 11 responds to the arbitration request when the overall state is in a state of the cyclic transmission stop M3, the cyclic transmission M4 or the cyclic transmission completion M5. When the overall state is in a state other than the above, the master station 11 does not respond to the arbitration request.

Figure 11:
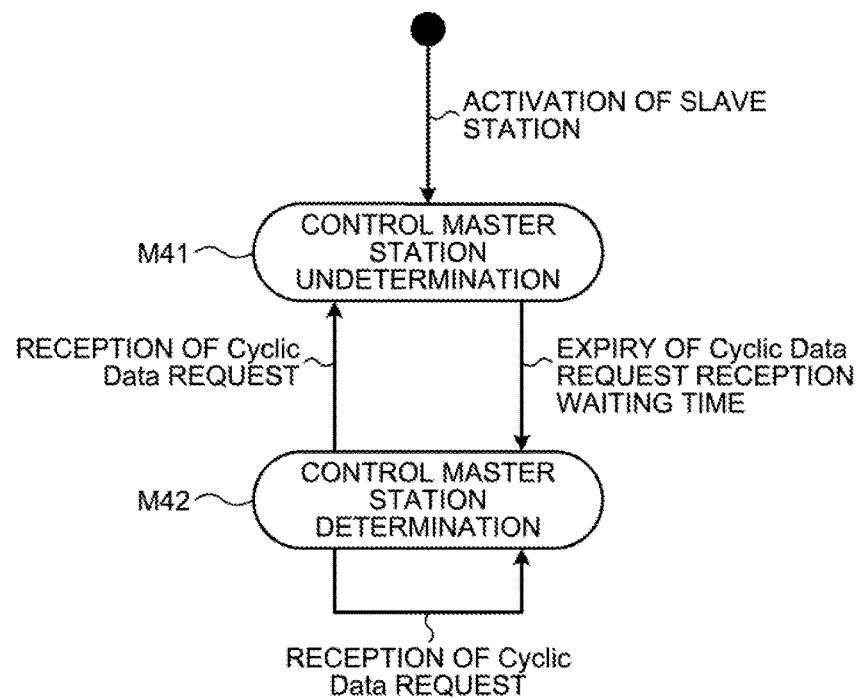
FIG. 11 is a state transition diagram of the slave station in the first embodiment.

FIG. 11 is a state transition diagram of the slave station 21 in the first embodiment. After activation of the slave station 21, the state management unit 215 sets a state of the slave station 21 to control master station undetermination M41, which is a state where a master station which controls the slave station 21 is undetermined. When the slave station 21 receives the Cyclic Data request frame from the master station 11 or the master station 12, the reception data processing unit 214 determines that the master station which has transmitted the Cyclic Data request frame is a control master station, and stores information on the master station, for example, an IP address, in the information storage unit 216. Thereafter, the state management unit 215 sets a state of the slave station 21 to control master station determination M42, which is a state where a master station which controls the slave station 21 has been determined. In the control master station determination M42, the timer management unit 218 activates a request reception waiting timer.

When receiving the Cyclic Data request frame from the master station while the request reception waiting timer is activated, the communication control unit 211 of the slave station 21 compares the information on the master station, which is a source of the Cyclic Data request frame, with the information on the control master station stored in the information storage unit 216. When the information on the master station as a source of the Cyclic Data request frame coincides with the information on the control master station stored in the information storage unit 216, the contents of the Cyclic Data request frame are notified to the reception data processing unit 214. When notified of the contents of the Cyclic Data request frame, the reception data processing unit 214 instructs the transmission data generation unit 217 to generate a response and notifies the timer management unit 218 that the Cyclic Data request frame has been received. Then, the transmission data generation unit 217 instructs the communication control unit 211 to transmit a Cyclic Data response frame, and the communication control unit 211 transmits the Cyclic Data response frame to the master station in unicast. The timer management unit 218 resets the request reception waiting timer.

When the request reception waiting timer expires without receiving the Cyclic Data request frame, the state management unit 215 determines that the control master station is absent and transitions the state of the slave station 21 to the control master station undetermination M41.

When the Cyclic Data request frame is received from the master station while the request reception waiting timer is activated, and the information on the master station as a source of the Cyclic Data request frame and the information on the control master station stored in the information storage unit 216 do not coincide with each other, the communication control unit 211 of the slave station 21 transmits an abnormal response frame which includes an end code indicating a master station redundancy abnormality stored therein to the master station as a source of the Cyclic Data request frame. That is, when the device control unit 213, which is a control unit of the slave station 21, receives control information for controlling the slave station 21 from a first master station, which is one of multiple master stations, and then receives control information for controlling the slave station 21 from a second master station, which is a master station other than the first master station among the multiple master stations, the device control unit 213 generates redundancy abnormality information indicating that there are multiple master stations which control the slave station. Then, the transmission unit 210 of the slave station 21 transmits the redundancy abnormality information to the second master station as an abnormal response frame. The state transitions in the slave stations 22 to 26 are similar to the state transition in the slave station 21.

In the above, the example has been described in which the master station 11 instructs the cyclic transmission as the control over the controlled device, but the control over the controlled device by the master station 11 is not limited thereto. Also in a case where the master station 11 performs other control over the controlled device, similarly to the above example, when it is determined that the control has been acquired by the arbitration process, a frame which includes control information for performing control stored therein may be transmitted to the slave station after the initial process is performed.

In the above example, the master station 11 transmits information indicating the slave stations set as an object to be controlled by the master station 11, and the master station 12, which has received the information, determines whether there is any overlap between the objects to be controlled by the master station 11 and the master station 12. However, the master station 11 may acquire, from the master station 12, information indicating the slave stations to be controlled by the master station 12 to determine whether there is any overlap therebetween. In that case, the master station 11 transmits in broadcast a frame requesting transmission of information indicating slave stations to be controlled by another master station instead of the Persuasion request frame. Then, the other master station transmits information indicating the slave stations to be controlled by the other master station to the master station 11 as a response. The master station 11 compares the information indicating the slave stations stored in the information storage unit 116 with the information indicating the slave station stored in the received response, and thereby it is possible to determine a slave station overlappingly set as an object to be controlled.

Regarding the master stations of the first embodiment, even when multiple master stations, which have a slave station overlappingly set as an object to be controlled by the multiple master stations, simultaneously participate in the network, one of the multiple master stations can acquire the control by performing the state transitions and the operations in each state as described above. It is unnecessary for the user to set information on other master stations in each master station, and redundant control of controlled devices due to erroneous setting by the user or omission of setting of an added master station does not occur. Furthermore, the master stations of the first embodiment can determine whether it is possible to operate a controlled device without requiring an operation by the user.

Second Embodiment

Figure 12:
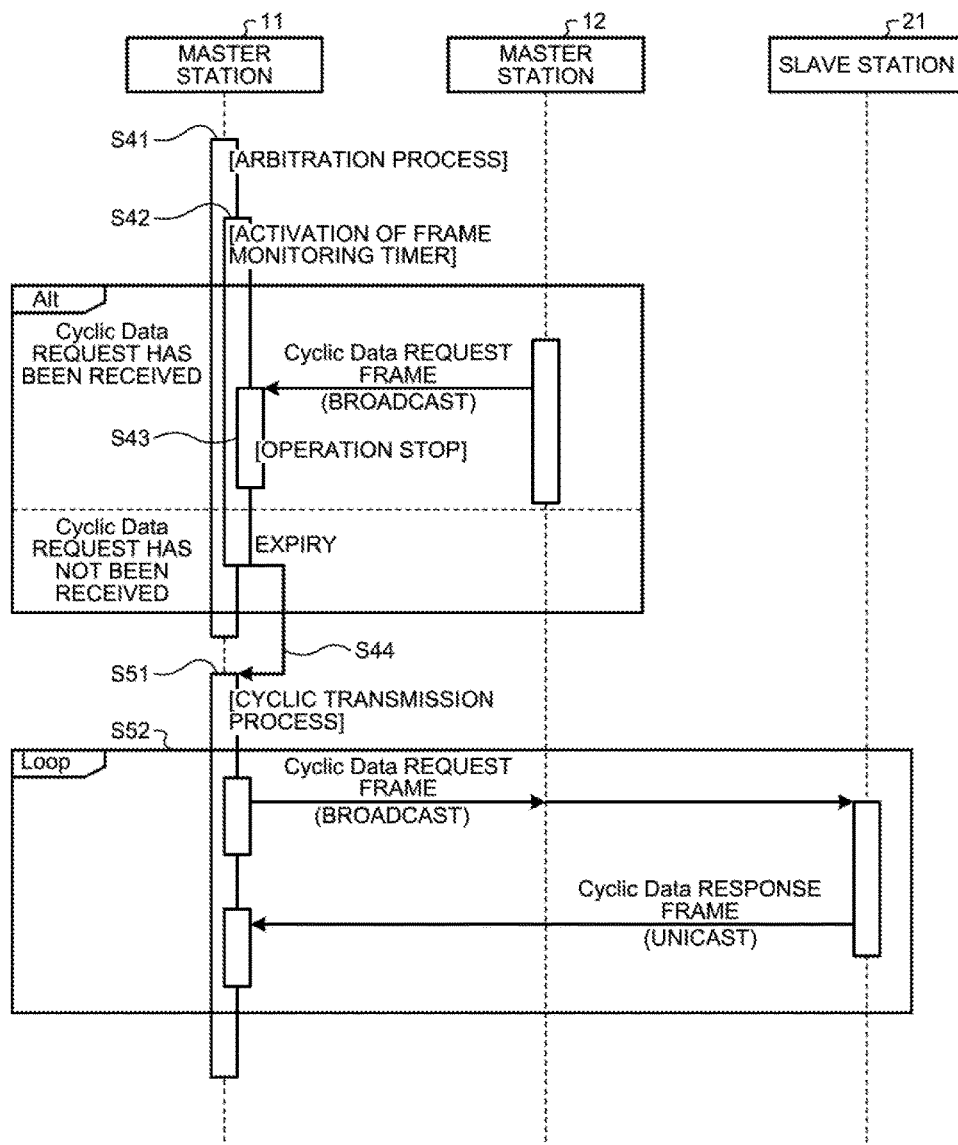
FIG. 12 is a sequence diagram illustrating operations in a second embodiment, from acquisition of control over a slave station after activation of a master station to start of communication with the slave station.

FIG. 12 is a sequence diagram illustrating operations in a second embodiment according to the present invention, from acquisition of control over a slave station after activation of a master station to start of communication with the slave station. Configurations of a communication system, master stations, and slave stations of the present embodiment are similar to those in the first embodiment. In the second embodiment, a communication frame used in the communication system is different from that in the first embodiment. In the second embodiment, state transition and some operations are different from those in the first embodiment. Hereinafter, differences from the first embodiment will be described.

In the first embodiment, three types of communication frames are used until the master station 11 starts communication with the slave stations 21 to 26, whereas one type of communication frame is used in the second embodiment. The operations from the activation of the master station 11 to the start of communication with the slave station 21 will be described with reference to FIG. 12.

First, when activated, the master station 11 performs an arbitration process for acquiring the control over the slave station 21 (Step S41). In the present embodiment, the master station 11 activates a frame monitoring timer first as an arbitration process (Step S42). Specifically, the timer management unit 118 of the master station 11 activates the frame monitoring timer.

When the master station 11 receives, between the activation of the frame monitoring timer and expiry thereof, a Cyclic Data request frame which includes the same port number as the port number used by the master station 11 stored therein, the master station 11 determines that there is an overlap of slave stations to be controlled and stops the operation (Step S43). The port number is stored in a UDP/IP header, for example. Formats of the Cyclic Data request frame and a response frame thereto are similar to those in the first embodiment. Specifically, when the communication control unit 111 receives a Cyclic Data request frame via the reception unit 112, the port number is extracted from the Cyclic Data request frame received from the reception unit 112. The communication control unit 111 notifies the reception data processing unit 114 of the port number extracted from the Cyclic Data request frame. The reception data processing unit 114 determines whether the port number extracted from the Cyclic Data request frame is the same as the port number used by the master station 11, and when it is the same port number, the operation is stopped. In the present embodiment, when the master station 11 receives a frame which includes the same port number as the port number used by the master station 11 stored therein from another master station, the master station 11 determines that the slave station can be controlled by the master station 12, which is the other master station. That is, in the present embodiment, the port number stored in the received Cyclic Data request frame is slave station information indicating the slave station controlled by another master station.

In a case where the master station 11 has not received the Cyclic Data request frame when the frame monitoring timer expires, or a case where the master station 11 has received the Cyclic Data request frame but the port number stored in the Cyclic Data request frame is different from the port number used by the master station 11, the master station 11 determines that the master station 11 can control the slave station, and proceeds to a "cyclic transmission process" after the expiry of the frame monitoring timer (Step S44).

In the "cyclic transmission process" (Step S51), the master station 11 sets a value indicating all OFF, for example, 0, in a cyclic transmission instruction of the Cyclic Data request frame and transmits the Cyclic Data request frame in broadcast. The slave station 21, which has received the Cyclic Data request frame, transmits a Cyclic Data response frame to the master station 11 in unicast. At this point in time, the master station 11 has not yet controlled the slave station 21. In the "cyclic transmission process" (Step S51), the master station 11 repeats the transmission of the Cyclic Data request frame and the reception of the Cyclic Data response frame (Step S52).

The master station 11 performs control of the slave station 21 from the transmission of a second and subsequent Cyclic Data request frames. That is, in the cyclic transmission instruction of each of second and subsequent Cyclic Data request frames, the master station 11 sets a bit corresponding to the slave station which has responded to the previously transmitted Cyclic Data request frame to a value indicating ON, that is, 1, for example, and transmits the Cyclic Data request frame in broadcast. As described above, the cyclic transmission instruction is information in which each bit corresponds to each slave station, and a value of each bit indicates whether each slave station performs the cyclic transmission.

Figure 13:
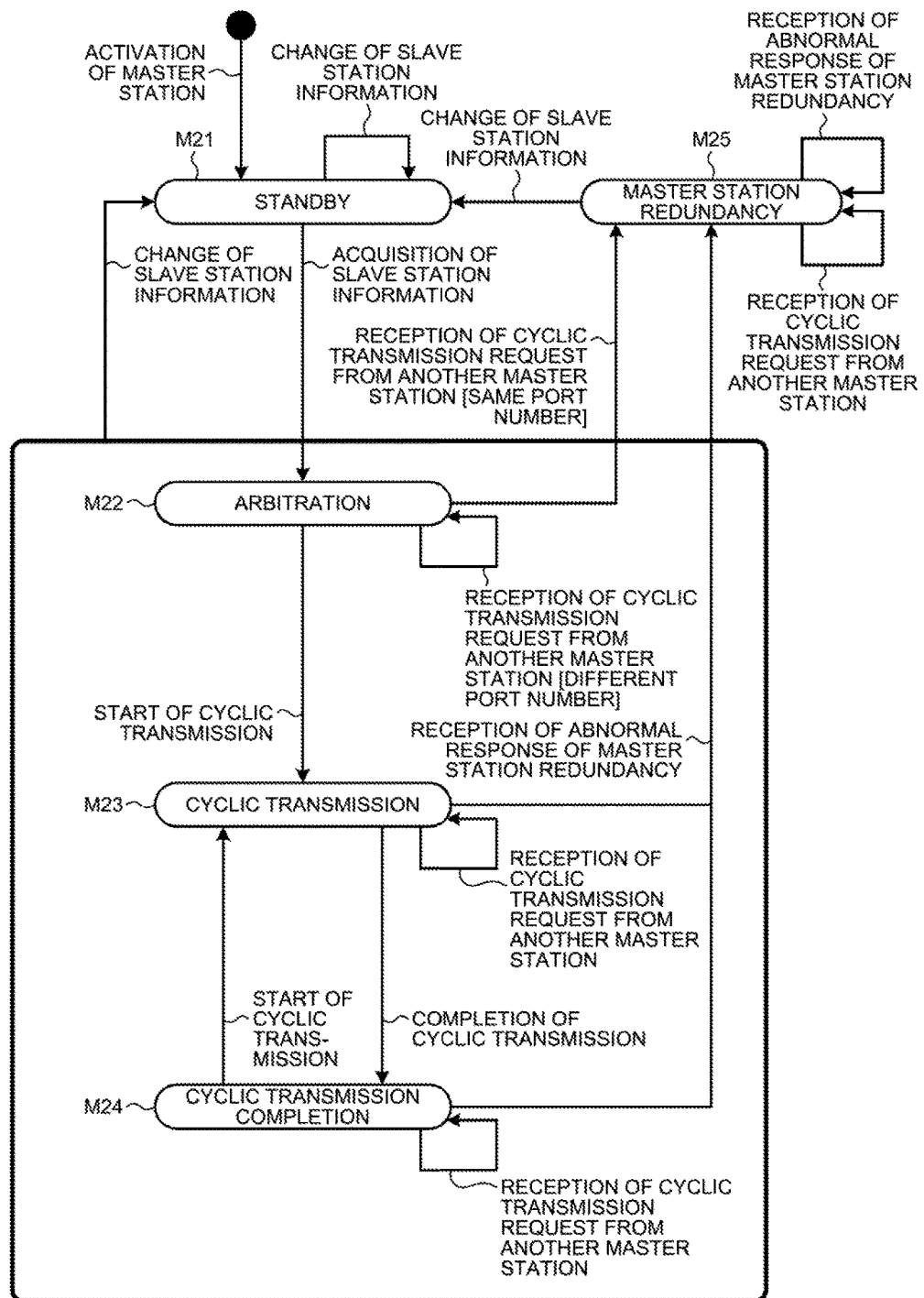
FIG. 13 is a state transition diagram of an overall state of the master station of the second embodiment.
Figure 14:
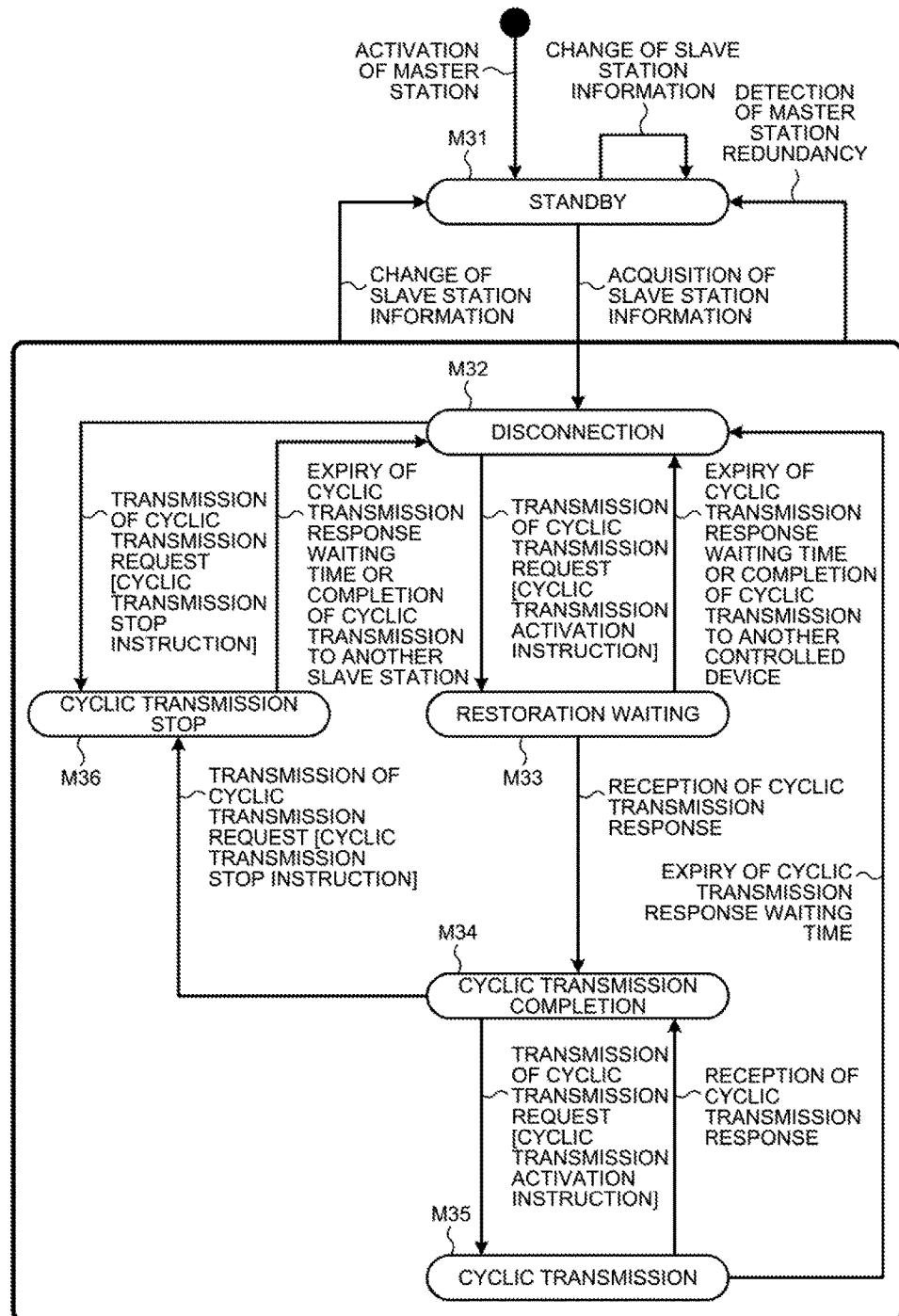
FIG. 14 is a state transition diagram of an individual state for each slave station of the master station of the second embodiment.

FIGS. 13 and 14 are state transition diagrams of the master stations 11 and 12 of the second embodiment. The states of the master stations 11 and 12 are managed in two states, an overall state indicating a state for all slave stations and an individual state indicating a state for each slave station. In the latter, the state is defined for each slave station. FIG. 13 illustrates the state transition of the overall state, and FIG. 14 illustrates the state transition for the individual state for each slave station. The state management units 115 of the master stations 11 and 12 each manage the overall state and the individual state for each slave station. In the following description of the state transition, the master station 11 will be taken as an example, but the same applies to the master station 12.

After activation of the master station 11, the state management unit 115 of the master station 11 sets the overall state to standby M21 and individual states for all slave stations to be controlled to standby M31. The transmission data generation unit 117, which has acquired the information on the slave stations to be controlled, that is, the IP addresses from the information storage unit 116, notifies the state management unit 115 of the acquisition, and the state management unit 115 sets the overall state to arbitration M22, which is a state where the arbitration is performed, and sets the individual state for each slave station to disconnection M32.

Thereafter, the master station 11 activates the frame monitoring timer. When receiving a Cyclic Data request frame with the same port number as the port number of the master station 11 before the expiry of the frame monitoring timer, the state management unit 115 transitions the overall state to the master station redundancy M25. When the Cyclic Data request frame with the same port number is not received before the expiry of the frame monitoring timer, the state management unit 115 transitions the overall state to cyclic transmission M23.

The master station 11 in the cyclic transmission M23 transmits a Cyclic Data request frame including a cyclic transmission activation instruction in broadcast, and activates a cyclic transmission response waiting timer. After the activation of the cyclic transmission response waiting timer, the state management unit 115 of the master station 11 sets the individual state for each slave station to restoration waiting M33, which is a state of waiting restoration. When there is no response before the expiry of the cyclic transmission response waiting timer, the state management unit 115 determines that there is no corresponding slave station in the network, and transitions the individual state for the corresponding slave station to the disconnection M32. When receiving at least one Cyclic Data response frame between the activation of the cyclic transmission response waiting timer and the expiry thereof, the state management unit 115 transitions the overall state to cyclic transmission completion M24, and sets the individual state for the slave station from which the Cyclic Data response frame has been received to cyclic transmission completion M34. Thereafter, regarding the overall state of the master station 11, the cyclic transmission M23 and the cyclic transmission completion 1424 are repeated, and regarding the individual state for the slave station from which the Cyclic Data response frame has been received, cyclic transmission M35 and the cyclic transmission completion M34 are repeated.

In a case where the master station 11 receives, as a response frame, an abnormal response frame which includes the end code of the master station redundancy abnormality stored therein from the slave station when the overall state is the cyclic transmission M23 or the cyclic transmission completion M24, the master station 11 transitions the overall state to the master station redundancy M25, and the operation is stopped, that is, the transmission of the control information to the slave station is stopped. The response frame is the abnormal response frame illustrated in FIG. 4, and a value indicating the master station redundancy abnormality is stored in the end code. The state transition and operations of the slave station are similar to those in the first embodiment. The slave station receives the Cyclic Data request frame from the master station while the request reception waiting timer is activated, and when information on the master station as a source of the Cyclic Data request frame and the information on the control master station stored in the information storage unit 216 do not coincide with each other, the slave station transmits an abnormal response frame to the master station as a source of the Cyclic Data request frame.

When the user wishes to intentionally stop the cyclic transmission, the user operates the master station 11 to cause the master station 11 to transmit the Cyclic Data request frame including the cyclic transmission stop instruction at the time of transmitting the cyclic transmission request, and thereby it is possible to stop the cyclic transmission for each slave station. At that time, the master station 11 transitions the individual state for the slave station as an object of the cyclic transmission stop instruction to cyclic transmission stop M36.

In a case where the master station 11 receives the Cyclic Data request frame from the master station 12, which is another master station when the overall state is the cyclic transmission M23 or the cyclic transmission completion M24, the master station 11 ignores the received frame entirely regardless of the port number stored in the received frame, that is, the operation in response to the reception of the Cyclic Data request frame is not performed.

The state transitions in the slave stations 21 to 26 are similar to those in the first embodiment.

Next, hardware configurations of the master stations 11 and 12 and the slave stations 21 to 26 according to the first embodiment and second embodiment will be described. The transmission units 110 of the master stations 11 and 12 and the transmission units 210 of the slave stations 21 to 26 are transmitters and the reception units 112 of the master stations 11 and 12 and the reception units 212 of the slave stations 21 to 26 are receivers. The information storage units 116 of the master stations 11 and 12 and the information storage units 216 of the slave stations 21 to 26 are memories. The controlled units 219 of the slave stations 21 to 26 are sensors, activators, or the like.

The communication control unit 111, the information storage unit 116, the device control unit 113, the state management unit 115, the timer management unit 118, the communication control unit 211, the device control unit 213, the state management unit 215, and the timer management unit 218 are each achieved by a processing circuit. The processing circuit may be a processing circuit which is dedicated hardware or a control circuit which includes a processor. In a case of dedicated hardware, the processing circuit is, for example, a circuit called a microcontroller. The processing circuit is, for example, a single circuit, a composite circuit, a programmed processor, a parallel programmed processor, an Application Specific Integrated Circuit (ASIC), a Field Programmable Gate Array (FPGA), or a combination thereof.

Figure 15:
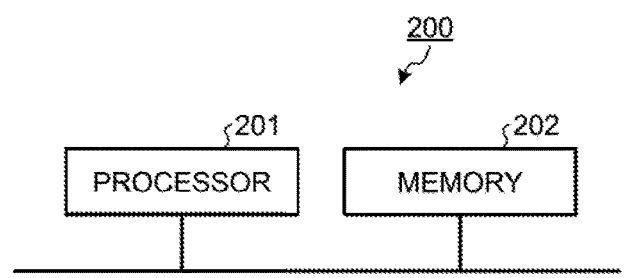
FIG. 15 is a diagram illustrating a configuration example of a control circuit according to the first embodiment and second embodiment.

When the processing circuit is achieved by a control circuit including a processor, the control circuit is a control circuit 200 configured as illustrated in FIG. 15, for example. FIG. 15 is a diagram illustrating a configuration example of the control circuit 200 of the present embodiment. The control circuit 200 includes a processor 201 and a memory 202. The processor is a Central Processing Unit (CPU, also referred to as a central processing device, a processing device, an arithmetic device, a microprocessor, a microcomputer, a processor, and a Digital Signal Processor (DSP)) or the like. The memory corresponds to, for example, a nonvolatile or volatile semiconductor memory such as a Random Access Memory (RAM), a Read Only Memory (ROM), a flash memory, an Erasable Programmable Read Only Memory (EPROM), or an Electrically Erasable Programmable Read Only Memory (EEPROM), a magnetic disk, a flexible disk, an optical disk, a compact disc, a mini disk, or a Digital Versatile Disk (DVD).

When the processing circuit is achieved by the control circuit 200 including the processor, the processing circuit is achieved by the processor 201 reading a program which is stored in the memory 202 and in which a process of each unit is described, and executing the program. In a case of the master stations 11 and 12, programs in which processes of the communication control unit 111, the device control unit 113, the state management unit 115 and the timer management unit 118 are described are stored in the memory 202, and the processor 201 reads and executes these programs. In a case of the slave stations 21 to 26, programs in which processes of the communication control unit 211, the device control unit 213, the state management unit 215 and the timer management unit 218 are described are stored in the memory 202, and the processor 201 reads and executes these programs. In the master stations 11 and 12, the memory 202 and the information storage unit 116 may be configured as the same memory. In the slave stations 21 to 26, the memory 202 and the information storage unit 216 may be configured as the same memory. The memory 202 is also used as a temporary memory in each process performed by the processor 201.

In the example described above, the port number is used as a condition for determining whether multiple master stations redundantly control a slave station. However, a network address may be used instead of the port number. That is, the master station 11 compares the network address used by the master station 11 with the network address stored in the received Cyclic Data request frame, and thereby the master station 11 can determine whether the multiple master stations control the slave station redundantly.

The configuration described in the embodiments above indicates one example of the content of the present invention and can be combined with other known technology, and a part thereof can be omitted or modified without departing from the gist of the present invention.

REFERENCE SIGNS LIST 11, 12 master station; 21 to 26 slave station; 110, 210 transmission unit; 111, 211 communication control unit; 112, 212 reception unit; 113, 213 device control unit; 114, 214 reception data processing unit; 115, 215 state management unit; 116, 216 information storage unit; 117, 217 transmission data generation unit; 118, 218 timer management unit; 219 controlled unit.

The invention claimed is:

1. A communication apparatus capable of controlling a slave station, the communication apparatus comprising:
   a transceiver to communicate via a network with another communication apparatus capable of controlling a slave station;
   a controller to acquire slave station information including information indicating slave stations to be controlled by the other communication apparatus, to obtain a slave station that does not overlap with a slave station to be controlled by the other communication apparatus as a controlled slave station of the communication apparatus based on the acquired slave station information, and to generate control information for controlling the controlled slave station of the communication apparatus; and
   a transmitter to transmit the control information to the controlled slave station of the communication apparatus.

2. The communication apparatus according to claim 1, wherein
   the controller generates acquisition request information indicating that acquisition of the slave station information is requested, and
   the transmitter transmits the acquisition request information to the other communication apparatus.

3. The communication apparatus according to claim 2, comprising:
   a memory to store first information that is information indicating the slave stations to be controlled by the communication apparatus; and
   a receiver to receive the slave station information as a response to the acquisition request information, wherein
   the acquisition request information includes the first information, and
   the slave station information is information that overlaps between the first information and second information indicating slave stations to be controlled by the other communication apparatus.

4. The communication apparatus according to claim 1, wherein the slave station information is a port number or a network address stored in a signal transmitted from the other communication apparatus.

5. The communication apparatus according to claim 4, wherein when the communication apparatus receives, from the slave station, information indicating that there is a plurality of the communication apparatuses controlling the slave station, the communication apparatus stops transmission of the control information to the slave station.

6. The communication apparatus according to claim 1, wherein the slave station information is information indicating a slave station overlapping between first slave stations that are the slave stations to be controlled by the communication apparatus and second slave stations that are the slave stations to be controlled by the other communication apparatus.

7. The communication apparatus according to claim 1, wherein after activation of the communication apparatus and before start of control of the slave station, the communication apparatus acquires the slave station information to obtain the controlled slave station of the communication apparatus.

8. The communication apparatus according to claim 2, wherein after activation of the communication apparatus and before start of control of the slave station, the communication apparatus acquires the slave station information to obtain the controlled slave station of the communication apparatus.

9. The communication apparatus according to claim 3, wherein after activation of the communication apparatus and before start of control of the slave station, the communication apparatus acquires the slave station information to obtain the controlled slave station of the communication apparatus.

10. The communication apparatus according to claim 4, wherein after activation of the communication apparatus and before start of control of the slave station, the communication apparatus acquires the slave station information to obtain the controlled slave station of the communication apparatus.

11. The communication apparatus according to claim 5, wherein after activation of the communication apparatus and before start of control of the slave station, the communication apparatus acquires the slave station information to obtain the controlled slave station of the communication apparatus.

12. The communication apparatus according to claim 6, wherein after activation of the communication apparatus and before start of control of the slave station, the communication apparatus acquires the slave station information to obtain the controlled slave station of the communication apparatus.

13. A communication system comprising a slave station and a plurality of communication apparatuses capable of controlling the slave station, wherein
   a first communication apparatus that is one of the communication apparatuses comprises:
   a controller to acquire slave station information including information indicating a slave station controlled by a second communication apparatus other than the first communication apparatus among the communication apparatuses, to obtain, as a controlled slave station, the slave station that does not overlap with a slave station to be controlled by the second communication apparatus among slave stations to be controlled by the first communication apparatus based on the slave station information, and to generate control information for controlling the controlled slave station; and
   a transmitter to transmit the control information to the controlled slave station.

14. A communication method in a communication apparatus capable of controlling a slave station, the communication method comprising:
   acquiring slave station information including information indicating slave stations to be controlled by another communication apparatus capable of controlling a slave station;
   obtaining, as a controlled slave station of the communication apparatus, a slave station that does not overlap with a slave station to be controlled by the other communication apparatus based on the acquired slave station information;
   generating control information for controlling the controlled slave station of the communication apparatus; and
   transmitting the control information to the controlled slave station of the communication apparatus.

* * * * *